United States Patent
Wright et al.

(10) Patent No.: US 11,866,541 B2
(45) Date of Patent: Jan. 9, 2024

(54) PURIFIED POLYMER AND METHODS FOR MAKING

(71) Applicant: Kraton Polymers LLC, Houston, TX (US)

(72) Inventors: Kathryn Wright, Houston, TX (US); Vijay Mhetar, Houston, TX (US); Bert Krutzer, Amsterdam (NL)

(73) Assignee: KRATON CORPORATION, Houston, TX (US)

( * ) Notice: Subject to any disclaimer, the term of this patent is extended or adjusted under 35 U.S.C. 154(b) by 416 days.

(21) Appl. No.: 17/249,274

(22) Filed: Feb. 25, 2021

(65) Prior Publication Data

US 2021/0261698 A1    Aug. 26, 2021

Related U.S. Application Data

(60) Provisional application No. 62/981,561, filed on Feb. 26, 2020.

(51) Int. Cl.
| | | |
|---|---|---|
| *C08F 6/28* | (2006.01) | |
| *C08F 293/00* | (2006.01) | |
| *C08F 118/08* | (2006.01) | |
| *C08G 65/38* | (2006.01) | |

(52) U.S. Cl.
CPC .............. *C08F 6/28* (2013.01); *C08F 118/08* (2013.01); *C08F 293/00* (2013.01); *C08G 65/38* (2013.01)

(58) Field of Classification Search
CPC ........ C08F 6/28; C08F 118/08; C08F 293/00; C08G 65/38
See application file for complete search history.

(56) References Cited

U.S. PATENT DOCUMENTS

2004/0092406 A1    5/2004   Osawa et al.

FOREIGN PATENT DOCUMENTS

| CN | 101654515 A | 2/2010 | |
|---|---|---|---|
| EP | 0447177 A2 | 9/1991 | |
| GB | 2245273 A | * 1/1992 | .............. C08F 6/001 |
| GB | 2245273 A | 1/1992 | |
| JP | 2005139306 A | 6/2005 | |

* cited by examiner

*Primary Examiner* — Robert D Harlan
(74) *Attorney, Agent, or Firm* — Beth Haslam

(57) ABSTRACT

A method to purify a polymer is disclosed. The method is part of a manufacturing process wherein a virgin polymer is produced from a polymerization process employing at least a monomer or a comonomer as a feedstock. The monomer or the comonomer is selected from the group consisting of organic polar monomers, inorganic monomers, vinyl aromatic monomers, conjugated dienes, and mixtures thereof. In the method, the polymer in solid, liquid or molten state is brought into contact with a fluid solvent or an extraction fluid in a supercritical state or near supercritical state. The contact is at controlled temperature and pressure, allowing the fluid solvent to diffuse into the polymer and extract the impurities intended to remove. The method can be used to remove at least 10%, or at least 20%, or at least 50% of the target impurity from the polymer.

20 Claims, 1 Drawing Sheet

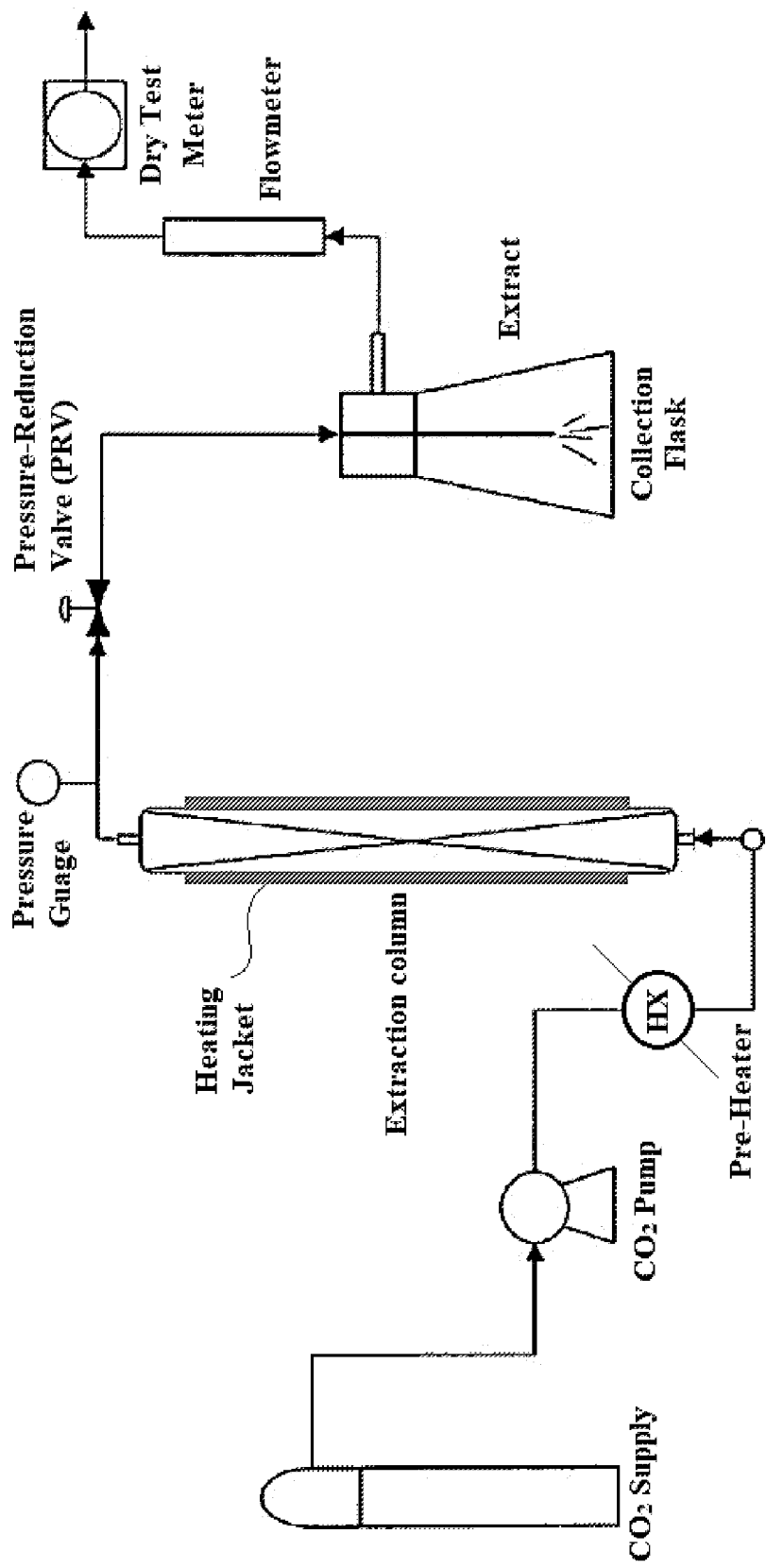

PURIFIED POLYMER AND METHODS FOR MAKING

CROSS-REFERENCE TO RELATED APPLICATIONS

This application claims benefit to U.S. provisional application No. 62/981,561, filed on Feb. 26, 2020, which is hereby incorporated herein by reference.

TECHNICAL FIELD

The disclosure relates to purified polymer compositions and methods to purify polymers as part of a process for making polymers.

BACKGROUND

In the process of making polymers, some components used in the process steps, e.g., catalysts, solvents, etc., are inherently present in the final product as residuals. Depending on the final applications employing the polymers, e.g., food, medical requiring Food and Drug Administration (FDA) approval, automotive with the evaporation of low molecular weight components or VOC (volatile organic compound), etc., there are guidelines as to limits for allowed or acceptable residual components in the finished product employing the polymers. For example, the European Medicines Agency has issued guidelines setting the upper limits for solvents in pharmaceutical products. The classification of solvents as class 1 (to be avoided), class 2 (to be limited) and class 3 (low toxic potential), as well as the acceptable levels for solvents in each class, can be changed over time to be more restrictive by the regulatory agencies.

In order to remove residual impurities from the final polymer product, there is a need for an effective way to remove inherent residuals, including but not limited to catalysts, solvents, process additives, chelating agents, solvent modifiers, and catalytic solvents from polymer compositions, with the purification step being a part of the manufacturing process steps, and not a treatment applied after the polymer had already been recovered in its final form.

SUMMARY

In a first aspect, the disclosure relates to a method to purify a polymer. The method comprises: providing a polymer from a polymerization process employing at least a monomer or a comonomer as a feedstock. The monomer or the comonomer is selected from the group consisting of organic polar monomers, inorganic monomers, vinyl aromatic monomers, conjugated dienes, and mixtures thereof. The polymer is in molten, liquid or solid form. The polymer contains at least an impurity to be removed. The polymer containing the impurity is brought into contact with a fluid solvent having a standard boiling point less than about 70° C. in an extraction vessel at a temperature from 80° C. to about 280° C. and at a pressure from 150 psig (1.03 MPa) to 8,000 psig (55.16 MPa). The pressure and temperature is controlled for the polymer to be essentially insoluble in the fluid solvent (and the impurity is soluble in the fluid solvent), or for the polymer to dissolve into the fluid solvent (and the impurity is essentially insoluble in the fluid solvent), for the fluid solvent to extract the impurity from the polymer. The purified polymer can be recovered by controlling the pressure and temperature to remove the extracted impurity from the purified polymer In embodiments, the impurity is selected from unreacted monomer or comonomer, catalyst residues, oligomers, byproducts, impurities in the monomer or comonomer, unreacted monomer or comonomer, solvents, residual processing aids, additives, modifiers, diluents, chelating agents, solvent modifiers, chain terminating agents, chain transfer agents, coupling agents, dimers, trimers, metals, catalyst decomposition products, polymer fractions, catalytic solvents, salts, acids, bases, odor-causing compounds, and mixtures thereof.

In a second aspect, a purified polymer is provided, wherein a virgin polymer in solid, liquid or molten state is brought into contact with a fluid solvent or an extraction fluid in a supercritical state or near supercritical state. The contact is at controlled temperature and pressure, allowing the fluid solvent to diffuse into the polymer and extract the impurities intended to remove.

DESCRIPTION OF THE DRAWINGS

FIG. 1 illustrates a set-up of the equipment used for the purification of a polymer.

DETAILED DESCRIPTION

The following terms used in the specification have the following meanings:

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and means A only, B only, as well as A and B. A list of embodiments presented as "A, B, or C" is to be interpreted as including the embodiments, A only, B only, C only, "A or B," "A or C," "B or C," or "A, B, or C".

"Monomer" refers to a molecule that can undergo polymerization which contributes constitutional units to the essential structure of a macromolecule, an oligomer, a block, a chain, and the like.

"Polymer" refers to a macromolecule comprising multiple repeating smaller units or molecules (monomers or comonomers) derived, actually or conceptually, from smaller units or molecules, bonded together covalently or otherwise. The polymer may be natural or synthetic. Polymer generally includes but is not limited to, homopolymers, copolymers, such as for example, block, graft, random and alternating copolymers, terpolymers, etc. and blends and modifications thereof.

"Copolymer" refers to a polymer derived from more than one species of monomer.

"Block copolymer" refers to a copolymer that comprises more than one species of monomer, wherein the monomers are present in blocks. Each block of the monomer comprises repeating sequences of the monomer.

"Comonomer" refers to a polymerizable precursor to a copolymer, aside from the principal monomer.

"Vinyl aromatic monomer" refers to an organic compound containing at least one carbon-carbon (C=C) double bond and at least one aromatic moiety. The aromatic moiety is a cyclic, planar structure with pi bonds in resonance which provides increased stability to the compound.

"Conjugated diene" refers to a molecule which contains two alkene linkages which are in conjugation, in other words, conjugated dienes have conjugated double bonds separated by one single bond. Conjugated diene has a total of 4 to 12 carbon atoms, e.g., 4 to 8 carbon atoms, which can be any of 1,3-butadiene, and substituted butadienes such as isoprene, 2,3-dimethyl-1,3-butadiene, 1-phenyl-1,3-butadiene, 1,3-pentadiene, 3-butyl-1,3-octadiene, chloroprene, and piperylene, or any combination thereof. In embodiments, the conjugated diene block comprises a mixture of butadiene and isoprene monomers. In embodiments, 1,3-butadiene alone is used "Organic polar monomer" refers to an organic polymerizable molecule containing at least one polar group. The polar group such as alcohol (OH), ether (—O—), carboxylic acid (—COOH), amine (—NH$_2$), nitrile (—CN), thiol (—SH) and the like. The polar group is in the organic polar monomer may be as a part of main chain or as a pendant group.

"Inorganic monomer" refers to a polymerizable molecule containing at least one inorganic group. The inorganic group such as silicone, phosphorus and the like.

"Virgin polymer" or "virgin polymers" refer to polymers which have never been used or processed before, and produced from a polymerization process employing feedstocks such as monomers, comonomers, etc. The virgin polymer may include additives which are commonly used for polymerization of monomer and/or comonomer to obtain the virgin polymer. Such additives include but are not limited to catalyst, inhibitors, scavengers, solvents, chain regulators, processing aids etc.

"Fluid solvent" refers to a substance that may exist in the liquid state under specified conditions of temperature and pressure. The fluid solvent can be a predominantly homogenous chemical composition of one molecule or isomer, or a mixture of several different molecular compositions or isomers. "Fluid solvent" also refers to substances that are at, near, or above the critical temperature and critical pressure (critical point) of that substance.

"Supercritical fluid" refers to substances above the critical point of that substance. Supercritical fluids do not have the typical physical properties (i.e. density) of a liquid. In this disclosure, supercritical fluid may be used interchangeably with fluid solvent.

"Dissolved" means at least partial incorporation of a solute (polymeric or non-polymeric) in a solvent at the molecular level, wherein the thermodynamic stability of the solute/solvent solution can be described by the following equation:

$\Delta G_{mix} = \Delta H_m - T\Delta S_{mix}$, where $\Delta G_{mix}$ is the Gibbs free energy change of mixing of a solute with a solvent, $\Delta H_m$ is the enthalpy change of mixing, T is the absolute temperature, and $S_{mix}$ is the entropy of mixing.

"Standard boiling point" refers to the boiling temperature at an absolute pressure of exactly 100 kPa (1 bar, 14.5 psia, 0.9869 atm) as established by the International Union of Pure and Applied Chemistry (IUPAC).

"Impurities" refers to mean components that are not the "polymer" in a "virgin polymer" composition, i.e., a polymer obtained in a polymerization process.

The disclosure relates to the process for making a "virgin" polymer with improved purity, by contacting the virgin polymer with the fluid solvent (extract fluid) in an extraction step to remove impurities from the virgin polymer, wherein the purification step is a part of the process of making a polymer. In embodiments, the purification step with the fluid solvent is integrated into the manufacturing process.

Polymers for Purification and Impurities for Removal: Polymers for purification include but are not limited to styrenic block copolymers; silicones; polyurethanes; poly ethylene-vinyl alcohol; engineering thermoplastic resins (or engineering polymers) such as nylon, polycarbonate, polyoxymethylene, polybutylene terephthalate, poly(phenylene oxide), and the like.

In embodiments, the virgin polymer is a polymer obtained by the polymerization process employing at least a monomer or comonomer as the feedstock. The monomer and the comonomer is selected from organic polar monomers, inorganic monomers, vinyl aromatic monomers, conjugated diene, and mixtures thereof.

In embodiments, the organic polar monomer is selected from urethane, acrylic acid, methacrylic acid, methyl acrylate, methyl methacrylate, ethyl acrylate, ethyl methacrylate, isopropyl acrylate, butyl acrylate, acrylamide, methacrylamide, acrylonitrile, methacrylonitrile, maleic anhydride, maleimide, phenylmaleimide, and mixtures thereof.

In embodiments, the inorganic monomer is selected from polymerizable compounds comprising at least one inorganic moiety. Examples of inorganic monomers include but are not limited to siloxanes, phosphoric acid derivatives, phosphonates, etc.

In embodiments, the vinyl aromatic monomer is selected from styrene, alpha-methylstyrene, methyl styrene, ethyl styrene, propyl styrene, butyl styrene, tert-butyl styrene, dimethyl styrene, halogenated styrene, methoxy styrene, acetoxy styrene, vinyl toluene, isomers of vinyl toluene, vinyl xylene, vinyl biphenyl, vinyl naphthalene, vinyl anthracene, and mixtures thereof. Halogenated styrene monomers may include mono-chloro styrene, di-chloro styrene, tri-chloro styrene, tetra-chloro styrene, penta-chloro styrene, bromo-styrene and mixtures thereof.

In embodiments, the conjugated diene is selected from 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, chloroprene, cyclohexadiene, and mixtures thereof.

The polymer may be a homopolymer obtained by a polymerization process employing monomers selected from organic polar monomers, inorganic monomers, vinyl aromatic monomers, and conjugated dienes. The polymer may be a copolymer obtained by a polymerization process employing a monomer and a comonomer, wherein the comonomer is different from the monomer and selected from organic polar monomers, inorganic monomers, vinyl aromatic monomers, the conjugated dienes, and combinations thereof. In embodiments, the polymer is a block copolymer obtained by a polymerization process employing a monomer comprising organic polar monomer and an inorganic monomer, giving a copolymer which is an organic-inorganic hybrid copolymer.

In embodiments, the virgin polymers for purification include but are not limited to block copolymers with a rubber midblock phase comprising a diene monomer or mixture of diene monomers and a rigid phase comprising a cyclic conjugated diene monomer or a vinyl aromatic monomer or mixtures thereof. In embodiments, the block copolymer has at least one of a cyclic conjugated diene monomer and a vinyl aromatic monomer copolymerized into the diene rubber midblock. In embodiments, the block copolymer is unhydrogenated, partially hydrogenated, selectively hydrogenated, or fully hydrogenated.

In embodiments, the virgin polymers for purification include styrenic block copolymer (SBC), e.g., styrene-butadiene-styrene (SBS), styrene-isoprene (SI), styrene-isoprene-styrene (SIS), styrene-ethylene/butylene-styrene (SEBS), styrene-ethylene/propylene-styrene (SEPS), and styrene-isoprene/butadiene-styrene (SIBS) or hydrogenated versions thereof. In embodiments, styrene monomer can be introduced or copolymerized into the diene blocks by any order and in any distribution. The SBC can be any of a linear, radial, or branched (multi-armed) block copolymer, comprising at least one vinyl aromatic monomer polymer block A and at least one conjugated diene polymer block B, optionally a coupling agent residue X. In embodiments, block B comprises at least one of cyclohexadiene butadiene and isoprene block copolymers, wherein the polybutadiene and polyisoprene soft blocks can be hydrogenated, and the polycyclohexadiene block can be either hydrogenated or dehydrogenated.

In embodiments, the SBC is sulfonated, i.e., having a sulfonate group, i.e., $-SO_3$, either in the acid form ($-SO_3H$, sulfonic acid) or a salt form ($-SO_3Na$). Examples include sulfonated block copolymer having a general configuration A-B-A, (A-B)n(A), (A-B-A)n, (A-B-A)nX, (A-B)nX, A-D-B, A-B-D, A-D-B-D-A, A-B-D-B-A, (A-D-B)nA, (A-B-D)nA (A-D-B)nX, (A-B-D)nX or mixtures thereof; where n is an integer from 1 to 30, or 2 to 20; and X is a coupling agent residue. Each A and B block is a polymer block resistant to sulfonation. Each B block is susceptible to sulfonation. The plurality of A blocks, B blocks, or D blocks are the same or different. Each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. Each B block comprises segments of one or more vinyl aromatic monomers. Each D block is selected from the group consisting of (i) a polymerized or copolymerized conjugated diene, (ii) a polymerized acrylate monomer, (iii) polymerized silicon, (iv) polymerized isobutylene and (v) mixtures thereof.

In embodiments, the SBC is an un-hydrogenated pentablock copolymer such as styrene-isoprene-butadiene-isoprene-styrene (SIMS). In embodiments, the SBC in embodiments is an un-hydrogenated block copolymer having a general structure of: A-B-A, A-I—B—I-A, (A-I—B)n-X, or $(A-B)_n$—X. Each A block is independently a vinyl aromatic compound. Each I is predominantly isoprene. Each B is predominantly butadiene. X is coupling agent residue, and n is an integer>=2.

In embodiments, the SBC is a hydrogenated block copolymer of the formula A-B-A, (A-B)nX, X is coupling agent residue, n has a value of 3. Before hydrogenation, each B block is a polymer of conjugated dienes. Before hydrogenation, each A block is a polymer of vinyl aromatic compound.

In embodiments, the SBC is a styrenic block copolymer in a form of aqueous dispersion having two or more polystyrene blocks containing less than 5 wt % of copolymerizable monomer based on the weight of the polystyrene block, and at least one block of polyisoprene containing less than 5 wt % of copolymerizable monomer based on the weight of block polymerized conjugated diene.

In embodiments, the SBC is further modified by graft-reacting with a functional group, chemically attached to either the styrene or the ethylene-butylene block chemically functional moieties. The functional group in embodiments is an unsaturated monomer having one or more saturated groups or their derivatives such as carboxylic acid groups and their salts, anhydrides, esters, imides, amides, or acid chloride groups. In embodiments, the functional group is selected from a silane, a sulfonic acid, a phosphate, a phosphine oxide, a phosphoric acid, an alkoxide, a nitrile, a thioether, thiol, a silicon or boron containing compounds, and combinations thereof. Examples include alkoxy-silane compounds and epoxy compounds.

In embodiments, the compounds for grafting have one or more functional groups or their derivatives such as carboxylic acid groups and their salts, anhydrides, esters, imide groups, amide groups, amine groups, bromides, acid chlorides and the like. Examples include quaternary ammonium salt, carboxylic acid/salt, maleic acid, fumaric acid, itaconic acid, citraconic acid, acrylic acid, glycidyl acrylate, cyanoacrylates, hydroxy $C_1$-$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, magnesium acrylate, and combination thereof.

Impurity Components: The impurities present in the virgin polymer for removal vary depending on many factors, including but not limited to the final virgin polymer to be made, the process used in making the virgin polymer, the (feedstock) raw materials including monomer or comonomer, unreacted monomer or comonomer, catalyst residues, oligomers, by-products, impurities already in monomer/comonomer feedstock, solvents, residual processing aids, additives, diluents, chelating agents, solvent modifiers, low molecular weight dimers, trimers, metals, catalyst decomposition products, polymer fractions, catalytic solvents etc. Within each variable, many factors come into play, for example with catalytic solvents, the impurities level vary according to the catalyst type, e.g., metals, organic molecules, salts, silanes, acids, bases, homogeneous, heterogeneous, etc.

The level of impurities and the type of impurities present also vary according to the polymerization process to make the virgin polymer. In embodiments, the virgin polymer can be produced by any polymerization process including but not limited to: coordination polymerization, anionic polymerization, radical polymerization, radical emulsion polymerization, cationic polymerization, condensation polymerization, ring opening metathesis, emulsion polymerization, etc.

There can be variations of the reaction process, e.g., a coordination polymerization (chain-growth polymerization) can be carried out with Ziegler-Natta catalysts or metallocene catalysts. A radical polymerization (successive addition of free-radical building blocks) can be atom transfer radical polymerization (ATRPs) with a transition metal catalyst, bulk polymerization with no solvent, solution polymerization, solid-state polymerization (SSP) etc.

In embodiments, the impurities for removal can be any of residual solvents, odor-causing compounds, residual catalysts, residual processing aids, and the like.

Manufacturing Process for Making Virgin Polymer: The virgin polymers can be manufactured using processes known in the art. For example, poly(phenylene oxide) virgin polymer is made via a process including condensation polymerization, oxidative coupling polymerization and step-growth with 2, 6-dimethylphenol as the monomer. With respect to ethylene vinyl acetate copolymer as a virgin polymer, it can be made by either bulk, solution polymerization, or emulsion polymerization.

In embodiments where SBC is a virgin polymer, it can be prepared by an anionic polymerization or by a sequential (or successive) polymerization of the monomers in solution in the presence of an initiator. The polymerization of the monomers can be performed by stepwise addition of the monomer and the initiator followed by coupling of the resulting block copolymers with a coupling agent (if present), and optionally followed by a hydrogenation step for the making of hydrogenated styrenic block polymers.

It is noted that the solvent for polymerization of virgin polymers is different from the fluid solvent. The solvent is typically of a saturated hydrocarbon solvent, ether, benzene, toluene, xylene or ethylbenzene, cyclohexane, or methylcyclohexane. In embodiments, a mixed solvent system is used with a saturated hydrocarbon and a straight chain or cyclic ether. The amount of solvent used in the polymerization step is 50-90 wt. % based on total weight of the monomer, comonomer, and the solvent. Depending on the applications, sometimes it is desirable to remove the residual solvent, or other additives for use in the polymerization process such as modifiers, chain terminating agents, chain transfer agents, coupling agents, etc., as an impurity.

As used herein, the applications refer to the end-use applications, e.g., food, medical, personal care, etc., as impurities such as odor-causing additives may not acceptable for a personal care application, and residual solvents above a certain amount may not acceptable for certain medical applications.

Purification Step: The purification step employs a fluid solvent for the impurity extraction, with the fluid solvent having unique tunable physical properties such as changeable density, liquid/gas-like viscosity and high diffusivity. The use of a fluid solvent allows using smaller amounts of solvent, or reduced energy consumption through efficient dissolution or reduced processing times. In embodiments, gaseous solvent recovery on depressurization from a supercritical state (i.e., reversion to a gas), allows the separation between the fluid solvent and the extracted impurity molecules that are in either solid or liquid state.

In embodiments, the fluid solvent is of standard boiling point less than about 70° C., or below the operating range to purify the polymer. The solvent is pressurized to be in a state in which there is little or no solvent vapor. The fluid solvent is selected from the group of carbon dioxide ($CO_2$), ketones, alcohols, ethers, esters, alkenes, alkanes, halogenated hydrocarbons, aliphatic hydrocarbons, cyclic hydrocarbons, aromatic hydrocarbons, and mixtures thereof. Non-limiting examples of the fluid solvent are $NH_3$, $H_2O$, $N_2O$, $CH_4$, acetone, methanol, dimethyl ether, diethyl ether, ethyl methyl ether, tetrahydrofuran, methyl acetate, ethylene, propylene, 1-butene, 2-butene, isobutylene, 1-pentene, 2-pentene, branched isomers of pentene, 1-hexene, 2-hexene, methane, ethane, propane, n-butane, isobutane, n-pentane, isopentane, neopentane, n-hexane, isomers of isohexane, chlorotrifluoromethane, monofluoromethane, 1,1,1,2-tetrafluoroethane, toluene, pyridine, cyclohexane, cyclohexanol, o-xylene, and $SF_6$ and other substances that may be apparent to those having ordinary skill in the art.

In embodiments, the fluid solvent is $CO_2$. The advantage of $CO_2$ as the fluid solvent in that it is abundantly available and inexpensive. In embodiments, the fluid solvent is a mixture of $CO_2$ and any of the above fluid solvents, e.g., $CO_2$ and ethane, or $CO_2$ and water.

The selection of the fluid solvent depends on the impurities to be removed and the virgin polymer to be purified. Further, the selection of the fluid solvent dictates the control of the temperature and pressure range for the purification step. Additionally, the extraction time or the amount of the fluid solvent used will depend on the desired purity of the final pure virgin polymer, and the amount of extractable contaminants or impurities in the starting virgin polymer.

In embodiments, the temperature and pressure ranges are controlled according to the temperature and pressure-dependent solubility properties, to prevent the fluid solvent from fully solubilizing virgin polymer while still being allowed to diffuse into the virgin polymer and extract the impurities to remove. In yet another embodiment, the purification is carried out by selecting the fluid solvent and controlling the pressure and temperature such that the polymer is dissolved in the fluid solvent, while the contaminants are not dissolved under the same conditions of temperature and pressure. The controlled dissolution enables the separation of the virgin polymer to be recovered from contaminants or impurities to be removed.

Virgin Polymer & Fluid Solvent Contact: In one embodiment, the purification step comprising contacting a virgin polymer to be purified with a fluid solvent at a temperature and at a pressure wherein the virgin polymer is molten or in a liquid state. In another embodiment, the virgin polymer to be purified is contacted with the fluid solvent at a temperature and at a pressure wherein the virgin polymer is in a solid state, after the polymer is recovered in a solid state, e.g., after the isolation by precipitation, and/or after the polymer is pelletized in an extruder. The virgin polymer in the solid state can be crystalline, semi-crystalline, or amorphous. In embodiments, the virgin polymer feedstock to be purified in a solid form, e.g., granular form, as spheres, cylinders, pellets, powder, gel, etc. In embodiments, the virgin polymer feedstock to be purified is in a liquid form as a solution.

The controlled extraction of impurities in one embodiment is by fixing the temperature of the virgin polymer/fluid solvent system, then controlling the pressure below a pressure, or pressure range, where the virgin polymer dissolves in the fluid solvent but not the contaminant(s) or impurities to be removed. In embodiments, the controlled extraction is accomplished by fixing the pressure of the virgin polymer/fluid solvent system and then controlling the temperature below a temperature, or temperature range where the virgin polymer dissolves in the fluid solvent. The impurities are removed from the virgin polymer upon dissolution of the virgin polymer in the fluid solvent, then removed from the fluid solvent via a subsequent separation step, e.g., solid-liquid separation.

The temperature and pressure-controlled extraction of the virgin polymer with the fluid solvent uses a suitable pressure vessel or equipment (e.g., an extruder, an extraction vessel, an extraction column, etc.) and may be configured in a way that allows for continuous extraction of the virgin polymer with the fluid solvent in the manufacturing process. In embodiments, the extraction may be performed in a batch mode, with the virgin polymer is contained in a pressure vessel with the fluid solvent being continuously pumped through the virgin polymer. In yet another embodiment, the purification is carried out in a continuous liquid-liquid extraction column ("extractor"), where the molten virgin polymer is pumped into one end of the extraction column and the fluid solvent is pumped into the same or the opposite end of the extraction column. In embodiments, the fluid solvent containing extracted contamination is purified, recovered, and recycled for use in the extraction step or a different step in the process.

In one embodiment, the fluid solvent is any of n-butane or n-heptane, with the virgin polymer being in contact with the fluid solvent at a temperature from 80° C. to about 220° C., or 100° C. to 200° C., or 130° C. to about 180° C. In embodiments, the contact is at a pressure from 1,000 psig (6.89 MPa) to 6,000 psig (41.37 MPa); or 1,000 psig (6.89 MPa) to 2,750 psig (18.96 MPa); or 1,500 psig (10.34 MPa) to 2,500 psig (17.24 MPa); or from 2,000 psig (13.79 MPa) to 4,000 psig (27.58 MPa).

In embodiments, the fluid solvent is $CO_2$, and the $CO_2$ feed to the extractor is at temperature substantially the same as the temperature of the extractor, e.g., 20-80° C., or 40-80° C., with the extractor operating at 100-1000 bar, or 200-800 bar, or 300-500 bar, and the residence time in the extractor of 0.5-2 hrs., with the weight ratio of the extraction fluid to the virgin polymer feed ranges from 1-300, or 5-200, or 10-150.

In embodiments, the removal of impurities/the purification step is carried out in the presence of a solid media to facilitate the removal of impurities by a variety of mechanisms including but not limited to adsorption, absorption, size exclusion, ion exclusion, and ion exchange. In embodiments with contaminants which are polar compounds, they may preferentially interact with solid media that are slightly polar, and with the use of non-polar fluid solvents such as alkanes. Examples of solid media include carbon-based substances such as anthracite coal, carbon black, coke, activated carbon, cellulose, and mixtures thereof; oxides of silica, oxides of aluminum, oxides of iron, aluminum silicates, magnesium silicates, amorphous volcanic glasses, silica, silica gel, diatomite, sand, quartz, reclaimed glass, alumina, perlite, fuller's earth, bentonite, and mixtures thereof. The solid media can be subsequently separated from the purified virgin polymer solution via a solid-liquid separation step, e.g., filtration, decantation, centrifugation, and settling.

Purified Virgin Polymer & Fluid Solvent Separation: After the contact step, the purified virgin polymer (or purer virgin polymer with reduced level of impurities) is separated from the fluid solvent at a temperature and at a pressure wherein the virgin polymer precipitates from solution and is no longer dissolved in the fluid solvent. In embodiments, the precipitation of the virgin polymer is carried out by reducing the pressure at a fixed temperature; or by reducing the temperature at a fixed pressure; or by increasing the temperature at a fixed pressure; or by reducing both the temperature and pressure.

In some embodiments, the fluid solvent can be partially or completely converted from the liquid to the vapor phase by controlling the temperature and pressure. In yet other embodiments, the precipitated virgin polymer is separated from the fluid solvent without completely converting the fluid solvent into a 100% vapor phase by controlling the temperature and pressure of the solvent during the separation step. The separation of the precipitated purer virgin polymer is accomplished by any method of liquid-liquid or liquid-solid separation In embodiments, the purified virgin polymer is further processed in a second purification step upon contact with another fluid solvent, which can be the same or different than the fluid solvent previously used, to produce a "purer" virgin polymer. In embodiments, there are multiple purification cycles, e.g., with each purification cycle employing a different fluid solvent tailored for the selective removal of certain impurities, or for each purification cycle with the fluid solvent being maintained at certain controlled temperature and/or pressure to dissolve the polymer but not the targeted impurities.

The method of purification of the polymer is not limited to the virgin polymer and suitable for purification of a reclaimed or recycled polymer. It can also be used for the purification of a recycled polymer.

The above-described purification step can be carried out in a location or at a facility separate from the process step where the virgin polymer is made. However, it can be more conveniently integrated into an existing manufacturing process for making a virgin polymer, meaning for the in-situ purification of the polymer, with the purification being the last treatment step for the virgin polymers (in liquid, molten, or solid form) prior to packaging and shipping to customers. In one example of process for the manufacturing of the virgin styrenic block copolymer, with the use of cyclohexane as a solvent, after a solvent removal step, the concentrated polymer solution may contain a residual solvent amount up to 10 wt. %, or up to 15 wt. % based on the total weight of the concentrated polymer melt (solution). The fluid solvent can be introduced with the concentrated polymer melt into an extruder for the purification to take place at a controlled temperature and pressure. After the removal of the impurities with the stripping of the fluid solvents, optional additives can be introduced into the extruder before the virgin polymer is recovered in a final purified form.

In yet another example, the purification step to remove impurities with the fluid solvent is carried out after the solvent removal or finishing step, e.g., after the polymer is extruded into pellets or recovered as powder or crumbs.

Properties of Purified Virgin Polymers: Depending on the selectivity, e.g., solubility properties of the polymers and the contaminants/impurities in the fluid solvent, and the operating conditions (e.g., controlled temperature and pressure), in embodiments, >20%, or >30%, or >50%, or >75%, or >90% of the (starting) targeted impurities in the virgin polymer are removed.

Applications of purified polymers: With the use of the fluid solvent as "extraction fluid" or the removal of certain impurities, impurities such as inherent residuals including catalysts, solvents, processing aids, solvent modifiers etc., can be effectively removed, with the purification being applied after the polymers are made/recovered.

With the purification by using fluid solvent(s) and "tuning" properties with respect to the solubility of the impurities in the fluid solvent(s), the virgin polymer can be made according to spec. for the specific end-use applications, e.g., food, medical, personal care, electronics, membranes, and the like, with strict limitations for allowed impurities.

Examples: The following examples are intended to be non-limiting.

FIG. 1 is a schematic illustration of an example of a system to purify the virgin polymer.

Materials: The following materials are used:

Polymer 1 is a "virgin" hydrogenated styrenic block copolymer (HSBC) with the microstructure of the rubber midblock having been modified. Polymer 1 has a polystyrene content (PSC) of 13%; a Shore A hardness of 38, tensile strength of 10.4 MPa, and a melt flow rate of about 14 g/10 min @230° C., 2.16 kg load, in the form of transparent pellets.

Polymer 2 is a "virgin" midblock-sulfonated pentablock copolymer, or a poly[tert-butylstyrene-b-(ethylene-alt-propylene)-b-(styrenesulfonate)-b-(ethylene-alt-propylene)-b-tert-butylstyrene] polymer, with a degree of sulfonation of 52%. The polymer is available as a solid "membrane" or as amber flakes/ribbon.

Polymer 3 is a "virgin" ethylene vinyl acetate copolymer, with 18% vinyl acetate, a melt flow rate of 3 g/10 min @190° C., 2.16 kg load, a Shore A hardness of 92, a melting point of 87° C., a Vicat softening point of 59° C., in the form of soft and translucent pellet.

Polymer 4 is a "virgin" poly(phenelyne ether) in the form of a white powder.

Example 1: About 22.4 g of Polymer 1 is charged to an extraction column as illustrated in FIG. 1. The column operates within a temperature range of 200-350 barg, and from 180 to 350° C. A suitable amount of $CO_2$ is passed through the vessel at pre-selected pressure and temperature conditions. The pressure of $CO_2$ is maintained in the column by the $CO_2$ pump (to ~305 bar pressure) and the incoming $CO_2$ is heated to ~256° C. by an up-stream heat exchanger (pre-heater). The high-pressure stream of $CO_2$ and the purified styrenic block copolymer leaving the extraction column is then passed through a pressure-reduction valve (PRV) into a collection flask where the "impurities" are collected. The atmospheric $CO_2$ exits from the collection flask and passes through a flowmeter and a dry test meter. The volume of $CO_2$ used for the purification of the polymer is measured by the dry test meter. $CO_2$ coming out from the dry test meter is further used for next batch for purification of another sample. Purified polymer stays in the column and is recovered thereafter.

It is noted that there are "globs" collected on the side walls of the flask, indicating the removal of impurities from the virgin polymer.

Example 2: The procedure of Example 1 is followed, except that the feed polymer is 10.5 g of Polymer 2 is charged to an extraction column. Original Polymer 2 feedstock has a distinct odor of ester(ethyl-isobutyrate). After extraction, "globs" of impurities are collected in the flask, and it is noted that most if not all of the smell disappears from the recovered polymer in the column. FTIR spectra of the polymer before and after extraction showing the disappearance of polar components (by-products of the sulfonation process).

Example 3: The procedure of Example 1 is followed, but with 20.5 g of Polymer 3 as the virgin polymer to be purified. Same observation as with Examples 1-2, with "globs" of impurities collected in the flask. The recovered polymer turns opaque and no longer transparent.

Example 4: The procedure of Example 1 is followed, but with 15.7 g of Polymer 4 as the virgin polymer to be purified. White globs of impurities are extracted/collected in the flask. Purified polymer is recovered from the column, which is compacted initially but can be easily broken up into powder as the original feed.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one reference. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method to purify a polymer, comprising:
    providing a polymer from a polymerization process employing at least a monomer or a comonomer as a feedstock, wherein the monomer or the comonomer is selected from the group consisting of organic polar monomers, inorganic monomers, vinyl aromatic monomers, conjugated dienes, and mixtures thereof, and
    wherein the polymer is in molten or solid form, and the polymer contains at least an impurity to be removed;
    wherein the impurity is selected from unreacted monomer or comonomer, catalyst residues, oligomers, by-products, impurities in the monomer or comonomer, solvents, residual processing aids, additives, modifiers, diluents, chelating agents, solvent modifiers, chain terminating agents, chain transfer agents, coupling agents, dimers, trimers, metals, catalyst decomposition products, polymer fractions, catalytic solvents, salts, acids, bases, odor-causing compounds, and mixtures thereof;
    contacting the polymer in molten or solid form containing the impurity with a fluid solvent having a standard boiling point less than about 70° C. in an extraction vessel at a temperature from 80° C. to about 280° C. and at a pressure from 150 psig (1.03 MPa) to 8,000 psig (55.16 MPa),
    wherein the pressure and temperature being controlled for the polymer to be essentially insoluble in the fluid solvent or for the polymer to dissolve into the fluid solvent, for the fluid solvent to extract at least 10% of the impurity from the polymer;
    recovering a purified polymer by controlling the pressure and temperature to remove the extracted impurity from the purified polymer; and
    collecting the extracted impurity.

2. The method of claim 1, wherein
    the polymer to be purified is essentially insoluble in the fluid solvent,
    the impurity is dissolved in the fluid solvent, and wherein
    the impurity precipitates out of the fluid solvent for collection when the fluid solvent is removed from the extraction vessel at reduced pressure.

3. The method of claim 1, wherein
    the impurity is essentially insoluble in the fluid solvent,
    the polymer to be purified is dissolved in the fluid solvent, and wherein the polymer precipitates out of the fluid solvent for collection when the fluid solvent is removed from the extraction vessel at reduced pressure.

4. The method of claim 1, further comprising: purifying the polymer having the impurity extracted therefrom, by bringing the purified polymer into contact with a solid media or a second fluid solvent same or different from the fluid solvent, at a temperature from 90° C. to about 220° C. and at a pressure from 350 psig (2.41 Mpa) to 20,000 psig (137.90 MPa).

5. The method of claim 1, wherein the polymer is a homopolymer, wherein the homopolymer comprises at least a monomer selected from the group of organic polar monomers, inorganic monomers, vinyl aromatic monomers, and conjugated dienes.

6. The method of claim 1, wherein the polymer is a copolymer, wherein the copolymer comprises a monomer and a comonomer, both selected from the group consisting of organic polar monomers, inorganic monomers, vinyl aromatic monomers, conjugated dienes, and combinations thereof, and wherein the comonomer is different from the monomer.

7. The method of claim 1, wherein the monomer or the comonomer is an organic polar monomer, and wherein the organic polar monomer is selected from the group consisting of urethane, acrylic acid, methacrylic acid, methyl acrylate, methyl methacrylate, ethyl acrylate, ethyl methacrylate, isopropyl acrylate, butyl acrylate, acrylamide, methacrylamide, acrylonitrile, methacrylonitrile, maleic anhydride, maleimide, phenylmaleimide, and mixtures thereof.

8. The method of claim 1, wherein the monomer or the comonomer is a vinyl aromatic monomer, and wherein the vinyl aromatic monomer is selected from styrene, alpha-methylstyrene, methyl styrene, ethyl styrene, propyl styrene, butyl styrene, dimethyl styrene, halogenated styrene, methoxy styrene, acetoxy styrene, vinyl toluene, isomers of vinyl toluene, vinyl xylene, vinyl biphenyl, vinyl naphthalene, vinyl anthracene, and mixtures thereof.

9. The method of claim 1, wherein the monomer or the comonomer is an inorganic monomer, and wherein the inorganic monomer is selected from polymerizable compounds comprising at least one inorganic moiety.

10. The method of claim 1, wherein the monomer or the comonomer is a conjugated diene, and wherein the conjugated diene is selected from 1,3-butadiene, isoprene, 2,3-dimethyl-1,3-butadiene, 1-phenyl-1,3-butadiene, 1,3-pentadiene, 3-butyl-1,3-octadiene, chloroprene, piperylene, and combinations thereof.

11. The method of claim 1, wherein the fluid solvent is selected from the group of carbon dioxide ($CO_2$), ketones, alcohols, ethers, esters, alkenes, alkanes, halogenated hydrocarbons, aliphatic hydrocarbons, cyclic hydrocarbons, aromatic hydrocarbons, and mixtures thereof.

12. The method of claim 1, wherein the polymer containing at least an impurity to be removed, is a styrenic block copolymer, and wherein the styrenic block copolymer is selected from a styrene-butadiene-styrene (SBS), a styrene-isoprene (SI), a styrene-isoprene-styrene (SIS), a styrene-ethylene/butylene-styrene (SEBS), a styrene-ethylene/propylene-styrene (SEPS), a styrene-isoprene/butadiene-styrene (SIBS) or hydrogenated versions thereof, and a sulfonated block copolymer having a sulfonate group in acid or salt form.

13. The method of claim 1, wherein the polymer containing at least an impurity to be removed is a block copolymer having a diene rubber midblock comprising a diene monomer or mixture of diene monomers and a rigid phase comprising a cyclic conjugated diene monomer or a vinyl aromatic monomer or mixtures thereof.

14. The method of claim 13, wherein the block copolymer has at least one of cyclic conjugated diene monomer and a vinyl aromatic monomer copolymerized into the diene rubber midblock.

15. The method of claim 14, wherein the block copolymer is unhydrogenated, partially hydrogenated, selectively hydrogenated, or fully hydrogenated.

16. The method of claim 1,
wherein the polymer contains up to 15 wt. % impurity prior to purification, and
wherein the purified polymer has an impurity level of at least 10% less than the impurity level of the polymer prior to purification.

17. The method of claim 1, wherein the polymer is purified in-situ as an integrated step in a manufacturing process where the polymer is obtained by the polymerization process employing the monomer or the comonomer as the feedstock, wherein the monomer or the comonomer is the vinyl aromatic monomer.

18. The method of claim 1, wherein the polymer is any of:
a homopolymer obtained by a polymerization process employing monomers selected from the group of organic polar monomers, inorganic monomers, vinyl aromatic monomers, conjugated dienes, and combinations thereof;
a copolymer obtained by a polymerization process employing a monomer and a comonomer selected from the group of organic polar monomers, inorganic monomers, vinyl aromatic monomers, the conjugated dienes, and combinations thereof, and wherein the comonomer is different from the monomer; or
a block copolymer obtained by a polymerization process employing a monomer comprising organic polar monomer and an inorganic monomer, and wherein the block copolymer is an organic-inorganic hybrid copolymer.

19. A polymer purified by the method of claim 1.

20. A polymer purified by the method of claim 1, wherein the purified polymer has an impurity level reduction of at least 20%.

* * * * *